Aug. 19, 1958    P. V. WHITNEY    2,848,102
MOLD CONVEYER
Filed May 6, 1955    3 Sheets-Sheet 1
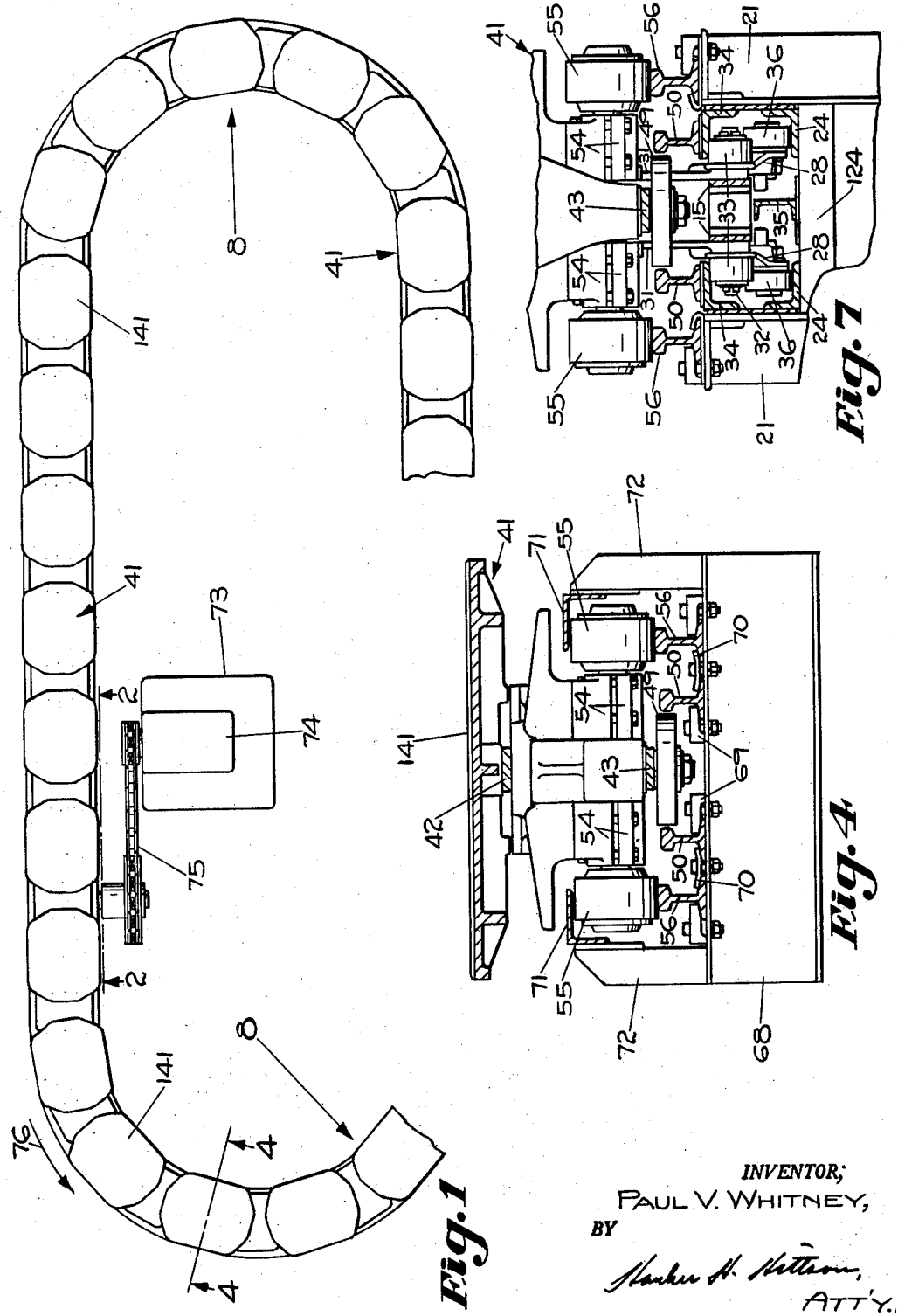
INVENTOR;
PAUL V. WHITNEY,
BY
ATT'Y.

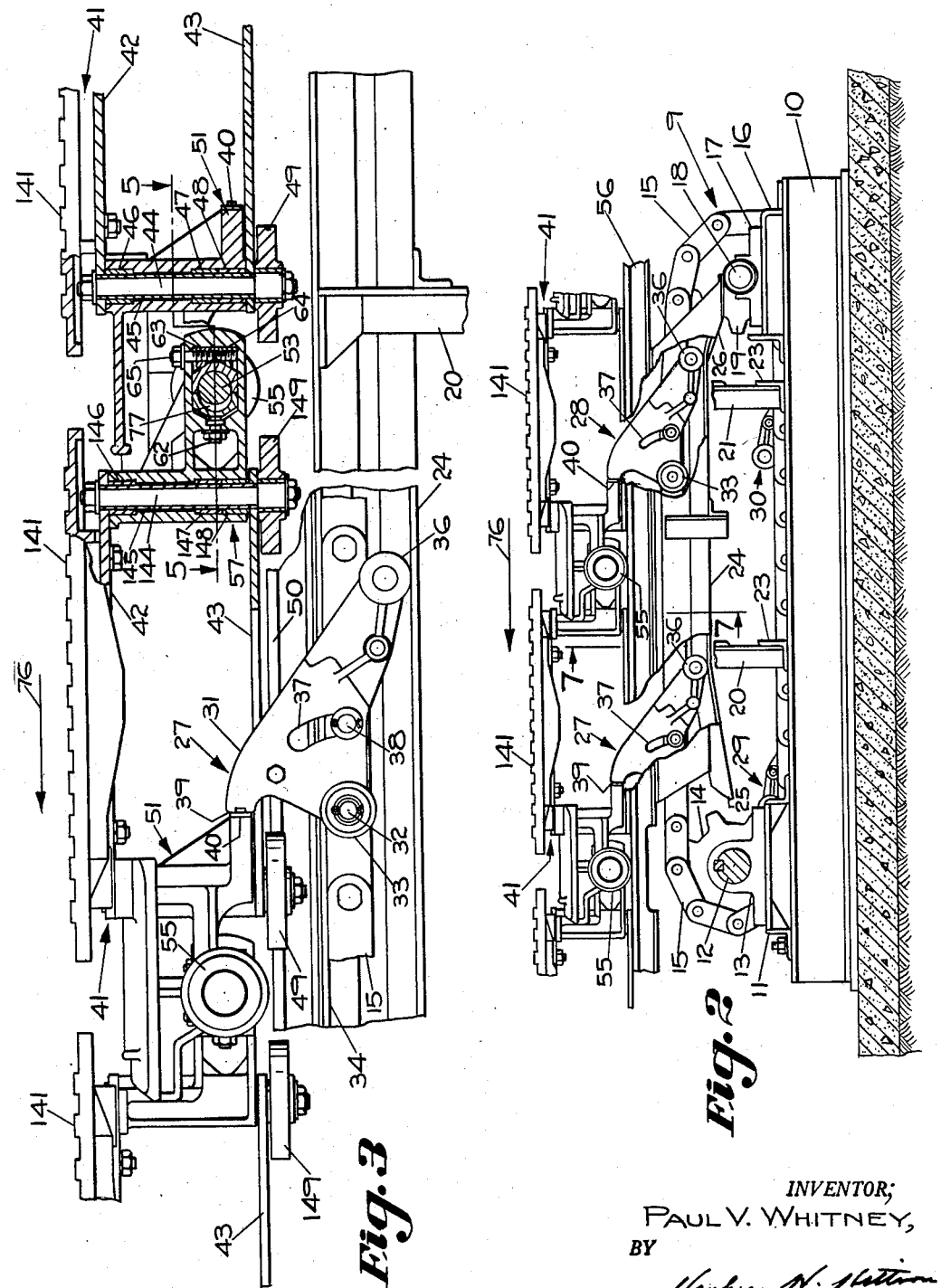

Aug. 19, 1958 P. V. WHITNEY 2,848,102
MOLD CONVEYER
Filed May 6, 1955 3 Sheets-Sheet 3
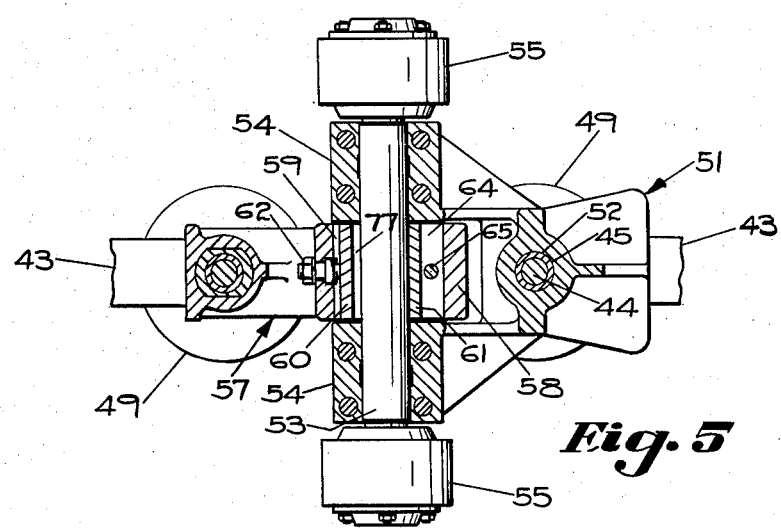
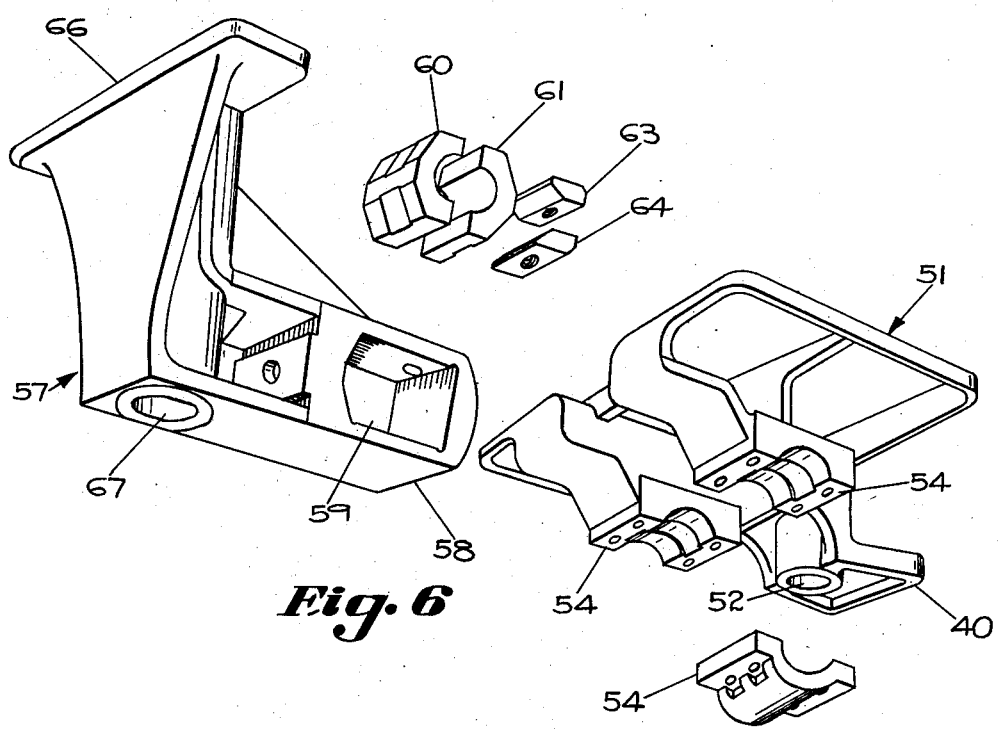
INVENTOR;
PAUL V. WHITNEY,
BY
ATT'Y.

United States Patent Office 2,848,102
Patented Aug. 19, 1958

2,848,102

MOLD CONVEYER

Paul V. Whitney, Columbus, Ohio, assignor to The Jeffrey Manufacturing Company, a corporation of Ohio Application May 6, 1955, Serial No. 506,551

8 Claims. (Cl. 198—181)

This invention relates to an improvement in conveyers, and more particularly to the type of conveyer adapted for use in conveying molds and the like. In general, the invention includes an improved means for coupling the trucks which form the conveyer. The invention also includes an improved means for applying power to drive the conveyer.

It is one of the objects of this invention to provide a conveyer designed and constructed to carry molds, for example, around an endless track extending through a casting or molding plant and the like and wherein the route followed may involve curves and changes of grade in the track upon which the wheeled trucks of the conveyer ride.

Another object of the invention is to provide a conveyer of the type described having a pivotal mounted connecting member for each truck adapted to provide for turning movement of each truck in a horizontal plane independently of any other truck when the trucks are coupled together.

Another object of the invention is to provide a conveyer of the character stated with means for coupling the connecting members of the trucks together so that each truck can move independently of any other truck in a vertical plane.

Another object of the invention is to provide means for applying power to drive a conveyer so that a constant pushing action is applied to move the trucks along the rails without appreciable power impulses or surges being encountered in the operation.

Another object is to provide a conveyer which is of a rugged design, inexpensive construction, and easily assembled with a minimum of time and skill.

Other objects of the invention will appear hereinafter, the novel features and combinations being set forth in the appended claims.

In the accompanying drawings, in which examples of preferred embodiments only of the invention are shown:

Fig. 1 is a top plan view showing a portion of an endless conveyor embodying the present invention, together with power means for driving the conveyer;

Fig. 2 is a side elevational view taken on plane 2—2 of Fig. 1 and illustrating the drive means used for moving the conveyer;

Fig. 3 is an enlarged side elevational view, partly in vertical section, showing one of the driving spurs and the means for coupling the trucks together;

Fig. 4 is a cross sectional view taken on plane 4—4 of Fig. 1 and showing the means used for holding the truck wheels on a curved portion of the tracks;

Fig. 5 is a horizontal sectional view taken on plane 5—5 of Fig. 3;

Fig. 6 is an exploded view showing parts of the coupling assembly; and

Fig. 7 is a vertical sectional view taken on plane 7—7 of Fig. 2.

Referring further to the drawings, a mold conveyer 8 (Fig. 1) is provided, which is driven by drive mechanism designated as a whole, by reference character 9 (Fig. 2). Said drive mechanism 9 includes a pair of horizontally spaced base beams 10, one of which is shown in Fig. 2, which supports a pair of head bearing bases 11 in which a head shaft 12 is journaled in bearings carried by pillow blocks 13. The head shaft 12 carries a sprocket 14 positioned midway between the base beams and which engages with the drives a chain 15. A pair of foot bearing take-up bases 16 are bolted to the base beams 10 and support pillow blocks 17 which carry bearings in which a foot shaft 18 is journaled. The foot shaft 18 carries a sprocket 19 positioned midway between the base beams 10 which engages with the chain 15 and is driven thereby.

A guide frame is provided for conveyer 8 and comprises pairs of oppositely disposed vertical angle members, two of which pairs are supported from the drive mechanism 9 and are seen at 20 and 21, Figs. 2, 3 and 7, and are supported in angle members 23 mounted on the base beams 10. Said vertical angle members carry a pair of angle members 24 on cross pieces 124 (Fig. 7). Above the drive mechanism 9, members 24 extend longitudinally and are spaced parallel to chain 15, one on each side thereof and form a guide rail. The guide rails 24 are sloped downwardly at their forward ends as indicated at 25, Fig. 2, and also at their rear ends as indicated at 26.

Means forming a pair of the drive mechanism 9 for applying power to move the trucks of the conveyor 8 along the rails are indicated generally at 27, 28, 29 and 30. These means comprise spurs or pusher elements pivotally connected at regular intervals to the chain 15, and which are spaced along the chain so that as the chain moves there is a substantially continuous engagement of one of said spurs with one of the trucks of the conveyer to provide a contant pushing action. In operation, one of a pair of the spurs, 27 and 28 for example in Fig. 2, is in engagement with one of the trucks to provide a pushing action to move the conveyer while substantially simultaneously therewith the other one of said pair of spurs disengages from contact with another one of said trucks. The application of power to move the conveyer is thus constant and free of surges or impulses, so that once started in motion the trucks do not jerk or vibrate while traveling.

Referring to Fig. 3, one of the spurs, for example 27, will be described in further detail. The other spurs 28, 29 and 30 are not further described because of their similarity in construction and operation to that of spur 27. The spur attachment 27 comprises a pair of right and left-hand plates 31 mounted parallel to each other on opposite sides of the chain 15 and which are pivotally connected at their lower forward ends to a shaft 32 which extends through the side plates of the chain 15 and carries a roller 33 on each end thereof. The rollers 33, Fig. 7, ride against the underside of angle members 34, which are fastened to the upper ends of the vertical members 20 and 21, and which provide guide members for holding the chain down. The center rail 35 which extends longitudinally on the cross members 23 supports the chain 15 from the underside thereof. Plates 31 at the rear ends thereof carry rollers 36 adapted to ride on the guide rails 24. Plates 31 are each slotted, as indicated at 37, Figs. 2 and 3. An axle 38 extending through the side bars of the chain 15 and carrying a roller, not shown, midway between the side bars extends through the slot 37 as shown. Thus, in operation, as the chain 15 moves carrying the spurs 27, 28, 29 and 30 around, the rollers 36 of spur 28, for example, engage and ride up the sloping end 26 of the guide rail 24. This movement of the rollers 36 causes the plates 31 to pivot upwardly about shaft 32 until the lower end of slot 37 contacts axle 38 which limits the upward travel of the spur and moves the head 39 of the spur into position for driving engagement with an abutment 40 formed on each of the trucks of the conveyer, as illustrated most clearly in Figs. 2 and 3. As shown in Fig. 2, when the spur 27, for example, reaches a point in its travel so that the roller 36 starts down the sloping end 25 of guide rail 24, plate 31 pivots downward about shaft 32 which allows the head 39 to disengage from driving contact with the abutment 40 on the truck. These operations of the spurs 27 and 28 are substantially simultaneous so that a constant driving force is being applied at all times to move the conveyer. With this construction there are no appreciable impulses of driving power applied to the conveyer. The application of power from the spurs to drive the conveyer is thus continuous and free from impulses or jerking action.

The mold conveyer 8 comprises a plurality of wheeled trucks, indicated generally at 41, carrying load supporting pallets 141, Figs. 2, 3 and 4, and which are hinged or articulatedly joined together to form the endless conveyer system 8, shown in Fig. 1. Each pallet 141 is supported upon a chassis assembly, Fig. 3, which includes a top bar 42 and a bottom bar 43. These bars 42 and 43 are connected at their front ends, for example, at the top and bottom, to a spindle 44 mounted in a thimble 45 which pivots in bushings 46, 47 and 48. Bars 42 and 43 are connected at their rear ends at the top and bottom to a spindle 144 mounted in a thimble 145 which pivots in bushings 146, 147 and 148. These spindles and thimbles form pivot members for the front and rear ends of each truck as more fully described hereafter.

A guide roller 49 for the front end of each truck turns on the lower end of the spindle 44 and a guide roller 149 for the rear end of each truck turns on the lower end of the spindle 144. These guide rollers are guided between a pair of inner guide rails 50 which are spaced apart in parallel relationship, and which are carried on the angle members 34, Fig. 7. The guide rails 50 are laid out around a horizontal course or path which will cause the conveyer to reach and serve the various units or stations of a foundry, or the like, as may be required. The guide rails 50 are constructed and laid to provide straight runs as well as lateral bends and curves and grades at different elevations.

A connecting member 51 forming, for example, a front part of one truck engages with a connecting member 57 forming a rear part of another truck to form an articulate joint or hinge which connects the forward end of each truck to the rear end of a preceding truck in the conveyer. This joint or hinge is formed by having the forward end of the truck chassis carried in the connecting member or wheel chassis casting 51, as seen most clearly in Figs. 3, 5 and 6, and the rear end of the truck chassis carried in the connecting member 57. The spindle 44, thimble 45 and bushings 46, 47 and 48 are mounted in an annular passage 52 formed in casting 51 as shown in Fig. 3. The spindle 144, thimble 145 and bushings 146, 147 and 148 are mounted in an annular passage 67 formed in casting 57 as more fully described hereafter. The spindle 44 and thimble 45 form a pivot member within the bushings 46, 47 and 48 which provides for turning movement of the front of a truck in a horizontal plane independently of any other truck. The spindle 144 and thimble 145 form a pivot member within the bushings 146, 147 and 148 which provides for turning movement of the rear of a truck in a horizontal plane independently of any other truck.

Casting 51 also carries a shaft or axle 53 the outer ends of which are supported in the bearings 54 and upon which are mounted the rollers 55, Fig. 5. These rollers in turn ride upon the outer rails or tracks 56 which are carried on the guide frame members 20 and 21, Fig. 7. The track rails 56 are spaced parallel to the guide rails 50, as shown in Figs. 4 and 7, and follow the same course or path.

The connecting member or link 57, shown most clearly in Fig. 6, is articulatedly joined or hinged to the wheel casting 51 by the shaft 53. This L-shaped casting 57 has its lower end 58 formed to be received within the wheel casting 51, see Fig. 5, between the bearings 54. The roller shaft 53 passes through the opening 59 in the end 58 of casting 57 when the castings 51 and 57 are assembled to form the joint or hinge coupling the trucks together. Bearing blocks 60 and 61 for the shaft 53 are mounted in the casting opening 59. A bolt 62, Figs. 3 and 5, provides for adjustably holding the bearing 60 on one side of the shaft. Bearing 61 is held on the opposite side of the shaft by means of the upper and lower wedge members 63 and 64 which are held by the bolt 65. As shown in Figs. 3 and 5, the casting 57 can move longitudinally relative to casting 51 to the extent of the clearance, indicated at 77, in the bearing blocks 60 and 61. The end 66 of casting 57 is formed with the annular passage 67 in which the spindle 144, thimble 145 and bushings 146, 147 and 148 for the rear end of each truck chassis are mounted as previously described.

The connecting members or castings 51 and 57 as thus constructed and joined or coupled together by the shaft 53 and the bearing members 54, 60 and 61 thereby provide for independent movement of the front and rear end of each truck in a vertical plane. Means are thus provided for connecting or coupling members 51 and 57 together so that the shaft 53 acts as a pivot member and thus provides for such movement.

In operation, when the castings 51 and 57 are assembled, as shown in Figs. 3 and 5, they form a connecting member for each truck which includes a pivot member adapted to provide for turning movement of each truck in a horizontal plane independently of any other truck when the trucks are coupled together. It will be apparent also that the trucks 41 are articulatedly joined or pivotally hinged together so that a lead truck may move independently relative to a trailing truck in a vertical plane as well as in a horizontal plane. The trucks are free to rise and fall relative to each other in a vertical plane, depending upon the grade of the tracks, because of the pivotal connection between the castings 51 and 57 about the shaft 53. Horizontal movement of a truck either to the right or to the left is also provided for since the truck is free to pivot about both the front and rear spindles 44 and 144.

Referring to Fig. 4, the construction shown illustrates a preferred form for curves or turns in the conveyer line. A base member or beam 68 extends transversely to the tracks or rails 50 and 56, as shown. The rails are fastened to beam 68 by means of clamps 69 and 70 which engage the flange portion of the rail and are bolted to the beam 68. Hold down members 71 fastened to the side members 72 extend over the rollers 55, as shown, to provide means for holding the rollers down when the trucks turn on curves. This hold down means thus prevents the truck from rising on one side or tilting and causing the load being carried to be spilled.

Diagrammatically illustrated and indicated at 73, Fig. 1, is a motor and a speed reducer 74 which are connected to the chain drive 75 to provide power for driving the sprocket 14 and chain 15. This crawl drive means drives chain 15 upon which the spurs 27, 28, 29 and 30 are mounted and which engage the abutments 40 on the trucks, as previously described, to provide for driving the trucks in a direction of travel as indicated by the arrow 76.

From the above description it will be readily apparent that this mold conveyer is of rugged and inexpensive construction. It will also be apparent that the provision for a pivotally mounted connecting member and coupling for each truck affords a construction which allows independent movement of each truck in both vertical and horizontal planes so that the conveyer can be used for courses or routes having substantial changes of grade as well as curves and bends therein. It is also evident that the provision for the application of power to move the coupled trucks along the rails by means of pivotally mounted and spaced pairs of spurs on the driving chain makes possible a substantially simultaneous engagement and disengagement of the spurs with the trucks so that there is a constant pushing action applied to move the conveyer. It is further evident from the drawings that the wheeled trucks, the guide and track rollers, the track and guide rails are all very effectively protected and shielded by the truck, pallet and coupling constructions so that it is practically impossible for sand or other foreign material to fall onto these members in sufficient quantities to interfere with the operation of the conveyer.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A conveyer comprising a plurality of individual trucks each having a load carrying body, said trucks being coupled end to end in succession for movement along a path, coupling means connecting the trucks end to end comprising, an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, said coupling members being adapted to pivot on the spindles to permit movement of the trucks laterally relatively to each other.

2. A conveyer comprising a plurality of individual trucks each having a load carrying body, said trucks being coupled end to end in succession for movement along a path, coupling means connecting the trucks end to end comprising, an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, and means on said spindles for guiding the trucks laterally in said path, said coupling members being adapted to pivot on the spindles to permit movement of the trucks laterally relatively to each other.

3. A conveyer comprising a plurality of individual trucks each having a load carrying body, said trucks being coupled end to end in succession for movement along a path, said path including a supporting track and a guiding track for the conveyer, coupling means connecting the trucks end to end comprising an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, roller means secured to the pivot means adapted to ride on the supporting track for supporting adjacent ends of successive trucks on said coupling members, and rollers on said spindles adapted to ride on the guiding track for guiding the trucks laterally in said path, said coupling members being adapted to pivot on the spindles to permit movement of the trucks laterally relatively to each other.

4. A conveyer comprising a plurality of individual trucks each having a load carrying body, said trucks being coupled end to end in succession for movement along a path, said path including a supporting track and a guiding track located below the supporting track for the conveyer, coupling means connecting the trucks end to end comprising an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, roller means on the pivot means adapted to ride on the supporting track for supporting adjacent ends of successive trucks on said coupling members, and rollers on said spindles disposed below the roller means on the pivot means adapted to ride on the guiding track for guiding the trucks laterally in said path, said coupling members being adapted to pivot on the spindles to permit movement of the trucks laterally relatively to each other.

5. A conveyer comprising a plurality of individual trucks each having a load carrying body, said trucks being coupled end to end in succession for movement along a path, coupling means connecting the trucks end to end comprising, an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, said coupling members being adapted to pivot on the spindles to permit movement of the trucks laterally relatively to each other, and driven means for operating the conveyer extending parallel to a run of the conveyer and including means for engaging a coupling member to push the trucks along the path.

6. A conveyer comprising a plurality of individual trucks each having a load carrying body, said trucks being coupled end to end in succession for movement along a path, coupling means connecting the trucks end to end comprising an upright spindle at each end of each truck secured to the truck body, a coupling member pivotally mounted on each spindle, at least one coupling member on each truck including an abutment for pushing the truck along the path, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, said coupling members being adapted to pivot on the spindles to permit movement of the trucks laterally relatively to each other, and driven means for operating the conveyer extending parallel to a run of the conveyer and including a pusher element adapted to engage the abutment on the coupling member to push the trucks along the path.

7. A conveyer comprising a plurality of individual trucks each having a load carrying body, said trucks being coupled end to end in succession for movement along a path, coupling means connecting the trucks end to end comprising, an upright spindle at each end of each truck secured to the truck body, a coupling member pivotally mounted on each spindle, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, said coupling members being adapted to pivot on the spindles to permit movement of the trucks laterally relatively to each other, and means for operating the conveyer comprising a driven chain having a spur adapted to engage a coupling member to push the trucks along the path, said spur being pivotally connected to the chain and being carried thereby into the path of the conveyer for engagement with the coupling member and out of the path of the conveyer away from engagement with the coupling member.

8. A conveyer comprising a plurality of individual trucks each having a load carrying body, said trucks being coupled end to end in succession for movement along a path, coupling means connecting the trucks end to end comprising an upright spindle at each end of each truck secured to the truck body, a coupling member pivotally mounted on each spindle, at least one coupling member on each truck including an abutment for pushing the truck along the path, pivot means joining the coupling member on one truck to the coupling member on the adjacent end of a successive truck, said pivot means extending transversely of the trucks between successive trucks permitting said successive trucks to move relatively to each other on said pivot means, means on the pivot means for supporting adjacent ends of successive trucks on said coupling members, said coupling members being adapted to pivot on the spindles to permit movement of the trucks laterally relatively to each other, and means for operating the conveyer comprising a driven chain having a spur adapted to engage the abutment on the coupling member to push the trucks along the path of the conveyer, said spur being pivotally connected to the chain and being carried thereby into the path of the conveyer for engaging the abutment and out of the path of the conveyer away from engagement with the abutment, and means engaging the spur as it is carried into the path of the conveyer by the chain for pivoting the spur into engagement with the abutment on the coupling member.

References Cited in the file of this patent

UNITED STATES PATENTS

| | | |
|---|---|---|
| 409,330 | McCaslin | Aug. 20, 1889 |
| 1,279,579 | Perkins | Sept. 24, 1918 |
| 1,420,705 | Horvath | June 27, 1922 |
| 1,884,112 | Morgan | Oct. 25, 1932 |
| 2,609,086 | McBride et al. | Sept. 2, 1952 |

FOREIGN PATENTS

| | | |
|---|---|---|
| 603,291 | Germany | Sept. 26, 1934 |